Dec. 20, 1932.                T. R. LAWRENCE                1,891,560
                           PISTON RING CONTRACTOR
                            Filed Dec. 10, 1931
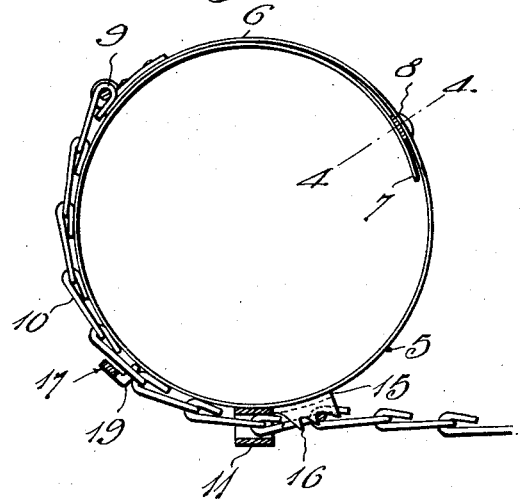
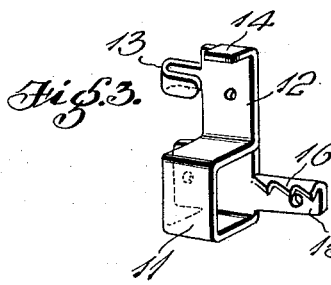
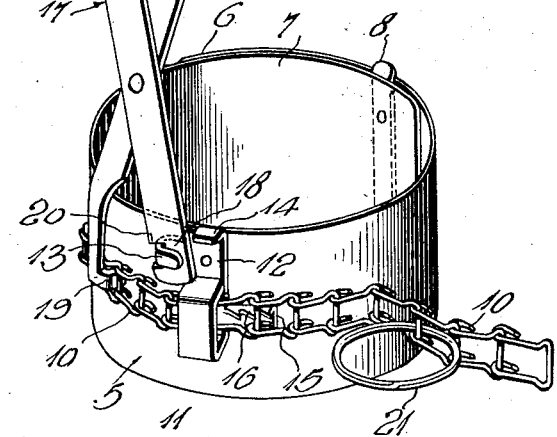
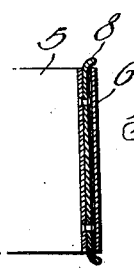
Witness
H. Woodard
Inventor
T. R. Lawrence
By H. R. Willson & co.
Attorneys.

Patented Dec. 20, 1932

1,891,560

UNITED STATES PATENT OFFICE

THEOPHILUS R. LAWRENCE, OF OAKLAND, CALIFORNIA

PISTON RING CONTRACTOR

Application filed December 10, 1931. Serial No. 580,137.

The invention aims to provide a new and improved device for contracting piston rings and holding them contracted within the ring grooves while the piston is being slipped into the cylinder.

In carrying out the above end, another object is to provide detachable tongs or other appropriate means for contracting the ring-holding collar, and to provide means carried by the collar for holding the latter contracted. Thus, after contraction of the collar and application of the holding means, the tongs or the like may be detached so that the contractor will not be unwieldly and cumbersome, and will consequently not interfere with easy insertion of the piston into the cylinder.

With the foregoing in view, the invention resides in the novel subject matter hereinafter described and claimed, description being accomplished by reference to the accompanying drawing.

Fig. 1 is a perspective view.

Fig. 2 is a horizontal sectional view.

Fig. 3 is a perspective view of the chain guide and associated details of construction.

Fig. 4 is a detail sectional view on line 4—4 of Fig. 2.

In the drawing above briefly described, the numeral 5 denotes a spring metal collar having slidably overlapped ends 6 and 7, the inner end 7 being preferably provided with a guide strip 8 slidably engaging the end 6. Suitably secured at 9 to the collar end 6, is a chain 10 which extends circumferentially of the collar but is provided with a free end. This chain passes slidably through a substantially rectangular guide 11 which is secured to the exterior of the collar 5, between the ends of the latter. Rigidly secured to the guide 11 and projecting therefrom toward one edge of the collar 5, is a plate 12 having an integral hook or lug 13 on one of its longitudinal edges and provided with another lug 14 at its outer end. Rigidly joined to the inner wall of the guide 11 and projecting therefrom toward an end of the collar 5, is an arm 15 having teeth 16 which may be engaged with links of the chain 10.

I provide a pair of tongs 17 for effecting tight contraction of the collar 5, said tongs having one jaw 18 shaped to engage the hook or lug 13 and having another jaw 19 to engage any link of the chain 10. The jaw 18 is preferably formed with a notch 20 to engage the hook or lug 13, and the lug 14 forms a guard to prevent accidental disengagement of the notch from the hook or lug aforesaid.

In using the device, it is expanded to the required extent and placed around the rings of a piston. The chain 10 is then pulled by hand while holding the collar, to initially contract said collar, said chain being then engaged with the teeth 16 to hold said collar in this initially contracted position. Then, the tongs 17 are engaged with the chain 10 and the hook or the like 13, and said tongs are operated to forcibly contract the collar 5. This having been done, the chain 10 is again engaged with the teeth 16 to hold the collar contracted so that the piston rings are well within the grooves. The tongs 17 are now removed from the collar and the piston with the attached collar is started into the cylinder. The piston is slid through the contracted collar while the latter rests against one end of the cylinder, and hence the piston rings leave the collar and enter the cylinder without catching upon the latter.

Preferably, a conventional key-ring or the like 21 is employed to limit the expansion of the collar 5, being engaged with any desired link of the chain 10.

While excellent results are obtainable from the details disclosed, attention is invited to the fact that within the scope of the invention as claimed, variations may be made.

I claim:—

1. A piston ring contractor comprising a contractible collar, a chain secured to one end of said collar for contracting the latter when pulled circumferentially thereof, means secured to said collar for engagement with said chain to hold the collar contracted, and tongs for tightening said chain, one jaw of said tongs being engageable with the chain, the collar being provided with means to engage the other jaw of the tongs.

2. A piston ring contractor comprising a contractible collar having overlapped ends, a chain secured to the outermost of said collar ends for contracting the collar when pulled circumferentially thereof, means secured to said collar for engagement with said chain to hold the collar contracted, and tongs for tightening said chain, one jaw of said tongs being engageable with the chain, the collar being provided with a hook to engage the other jaw of the tongs.

3. A piston ring contractor comprising a contractible collar having overlapped ends, a chain secured to the outermost of said collar ends for contracting the collar when pulled circumferentially thereof, and a guide through which said chain passes slidably, said guide being secured to said collar and having a lug for engagement with one jaw of a pair of tongs; whereby, upon engagement of the other jaw of the tongs with the chain, the latter may be tightened.

4. A piston ring contractor comprising a contractible collar having overlapped ends, a chain secured to the outermost of said collar ends for contracting the collar when pulled circumferentially thereof, a substantially rectangular guide through which said chain passes, said guide being secured to said collar, a plate rigidly connected with said guide and projecting therefrom toward one edge of the collar, said plate having a hook for engagement with one jaw of a pair of tongs; whereby, upon engagement of the other jaw of the tongs with the chain, the latter may be tightened; an arm secured to the inner wall of said guide and projecting therefrom toward an end of the collar, and teeth on said arm for engagement with said chain to hold the latter when tightened.

In testimony whereof I affix my signature.

THEOPHILUS R. LAWRENCE.